US012652315B2

(12) United States Patent
May et al.

(10) Patent No.: US 12,652,315 B2
(45) **Date of Patent: *Jun. 9, 2026**

(54) REMOTE MONITORING OF A SECURITY OPERATIONS CENTER (SOC)

(71) Applicant: Fortinet, Inc., Sunnyvale, CA (US)

(72) Inventors: Robert A. May, North Vancouver (CA); Jordan E. Thompson, Vancouver (CA)

(73) Assignee: FORTINET, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,562

(22) Filed: Oct. 3, 2022

(65) Prior Publication Data

US 2024/0114060 A1 Apr. 4, 2024

Related U.S. Application Data

(63) Continuation of application No. 16/452,667, filed on Jun. 26, 2019, now Pat. No. 11,477,240.

(51) Int. Cl.
*H04L 9/00* (2022.01)
*H04L 9/40* (2022.01)

(52) U.S. Cl.
CPC .......... *H04L 63/20* (2013.01); *H04L 63/1425* (2013.01); *H04L 63/1433* (2013.01); *H04L 63/302* (2013.01)

(58) Field of Classification Search
CPC .................................................... H04L 63/302
USPC ......................................................... 726/22
See application file for complete search history.

(56) References Cited

U.S. PATENT DOCUMENTS

| | | | | |
|---|---|---|---|---|
| 6,456,306 | B1 * | 9/2002 | Chin .................... | H04L 41/0213 |
| | | | | 709/224 |
| 7,127,743 | B1 * | 10/2006 | Khanolkar ............ | G06F 21/552 |
| | | | | 709/224 |
| 9,918,045 | B1 * | 3/2018 | Moss .................... | G06F 3/0481 |
| 2006/0031938 | A1 * | 2/2006 | Choi .................... | H04L 63/1441 |
| | | | | 726/25 |
| 2013/0298244 | A1 * | 11/2013 | Kumar .................... | G06F 21/51 |
| | | | | 726/25 |
| 2016/0274744 | A1 * | 9/2016 | Neumann ........ | H04N 21/47202 |
| 2017/0085587 | A1 * | 3/2017 | Turgeman ............... | G06F 21/32 |
| 2017/0339063 | A1 * | 11/2017 | Chundury .............. | H04L 47/27 |

(Continued)

*Primary Examiner* — Christopher J Brown
(74) *Attorney, Agent, or Firm* — Jaffery Watson Hamilton & DeSanctis LLP

(57) ABSTRACT

Systems and methods for remote monitoring of a Security Operations Center (SOC) via a mobile application are provided. According to one embodiment, a management service retrieves information regarding multiple network elements that are associated with an enterprise network and extracts parameters of the monitored network elements from the retrieved information. The management service prioritizes the monitored network elements by determining a severity level associated with security-related issues of the network elements and generates various monitoring views that summarize in real time various categories of potential security-related issues detected by the SOC. Further, the management service assigns a priority to each monitoring view and displays a video on the display device that cycles through monitoring views in accordance with their respective assigned priorities.

20 Claims, 9 Drawing Sheets

(56) References Cited

U.S. PATENT DOCUMENTS

| | | | |
|---|---|---|---|
| 2018/0121035 A1* | 5/2018 | Filippi | G06F 40/169 |
| 2019/0149772 A1* | 5/2019 | Fernandes | G06F 3/0486 |
| | | | 348/159 |
| 2020/0007957 A1* | 1/2020 | Xi | H04L 67/60 |
| 2020/0067985 A1* | 2/2020 | Bhargava | G06F 3/0481 |

* cited by examiner

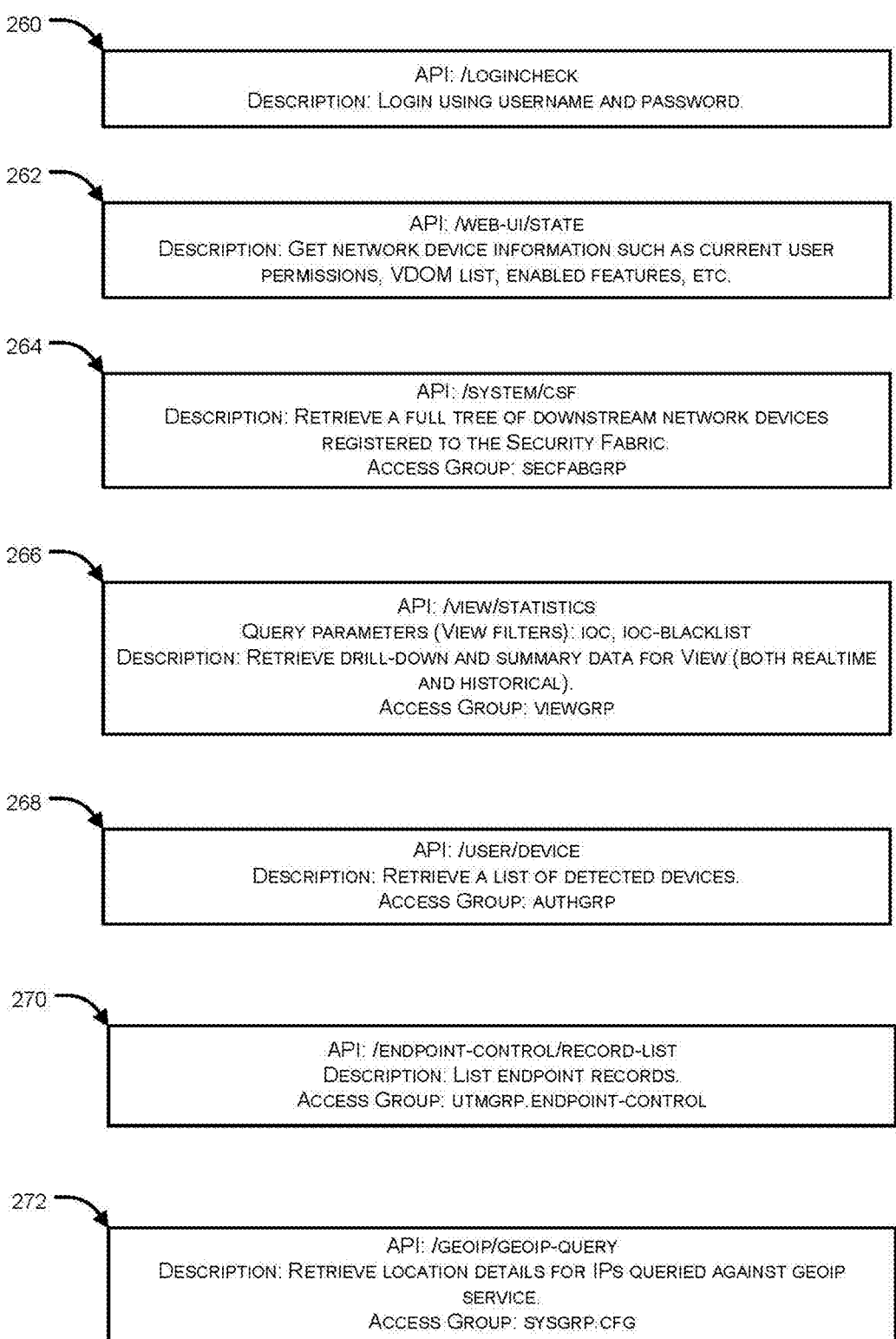

260 — API: /LOGINCHECK
DESCRIPTION: LOGIN USING USERNAME AND PASSWORD.

262 — API: /WEB-UI/STATE
DESCRIPTION: GET NETWORK DEVICE INFORMATION SUCH AS CURRENT USER PERMISSIONS, VDOM LIST, ENABLED FEATURES, ETC.

264 — API: /SYSTEM/CSF
DESCRIPTION: RETRIEVE A FULL TREE OF DOWNSTREAM NETWORK DEVICES REGISTERED TO THE SECURITY FABRIC.
ACCESS GROUP: SECFABGRP

266 — API: /VIEW/STATISTICS
QUERY PARAMETERS (VIEW FILTERS): IOC, IOC-BLACKLIST
DESCRIPTION: RETRIEVE DRILL-DOWN AND SUMMARY DATA FOR VIEW (BOTH REALTIME AND HISTORICAL).
ACCESS GROUP: VIEWGRP

268 — API: /USER/DEVICE
DESCRIPTION: RETRIEVE A LIST OF DETECTED DEVICES.
ACCESS GROUP: AUTHGRP

270 — API: /ENDPOINT-CONTROL/RECORD-LIST
DESCRIPTION: LIST ENDPOINT RECORDS.
ACCESS GROUP: UTMGRP.ENDPOINT-CONTROL

272 — API: /GEOIP/GEOIP-QUERY
DESCRIPTION: RETRIEVE LOCATION DETAILS FOR IPS QUERIED AGAINST GEOIP SERVICE.
ACCESS GROUP: SYSGRP.CFG

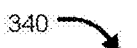
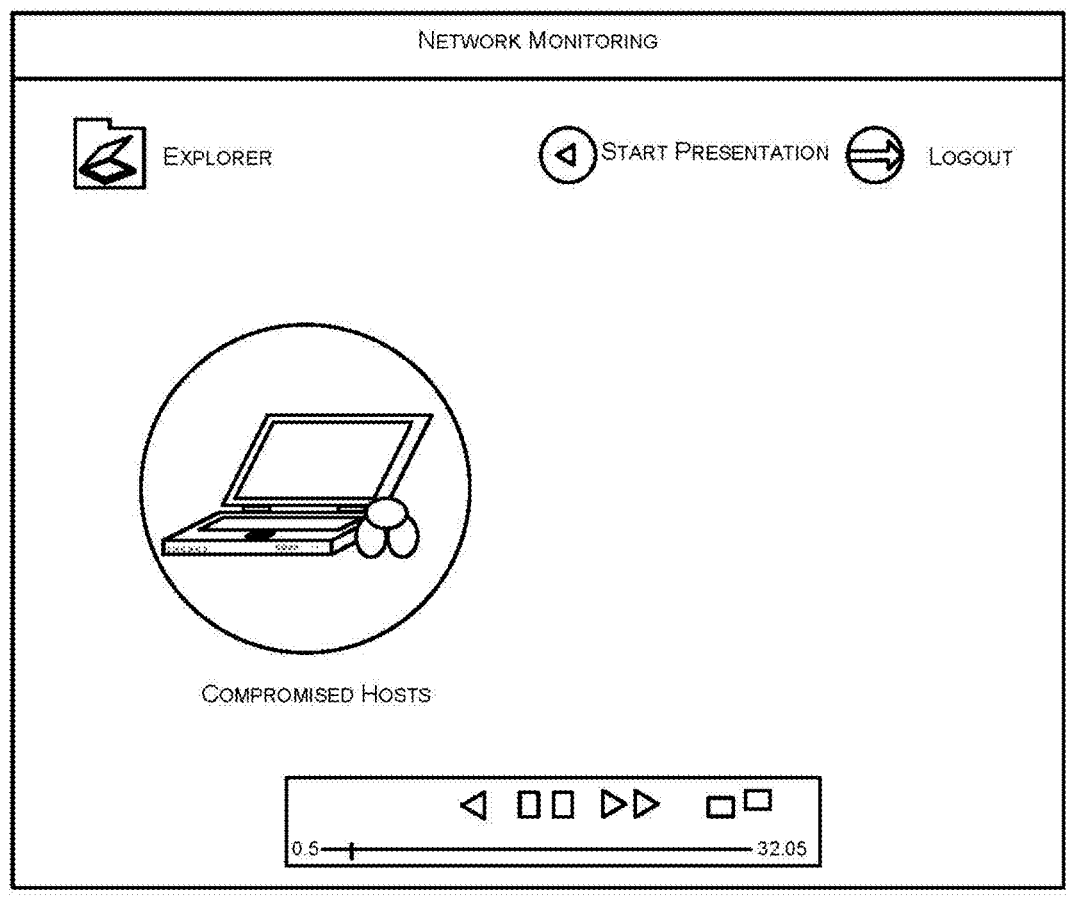
FIG. 3C

350

NETWORK MONITORING

EXPLORER                    ◁ START PRESENTATION    ⇒ LOGOUT

COMPROMISED HOSTS                    SECURITY RATING

COMPROMISED HOST-1          9.14

COMPROMISED HOST-2          8.5

COMPROMISED HOST-3          7.5

COMPROMISED HOST-4          6.5

◁  □□  ▷▷  □□

0.5 ————————————————— 32.05

360

370

400

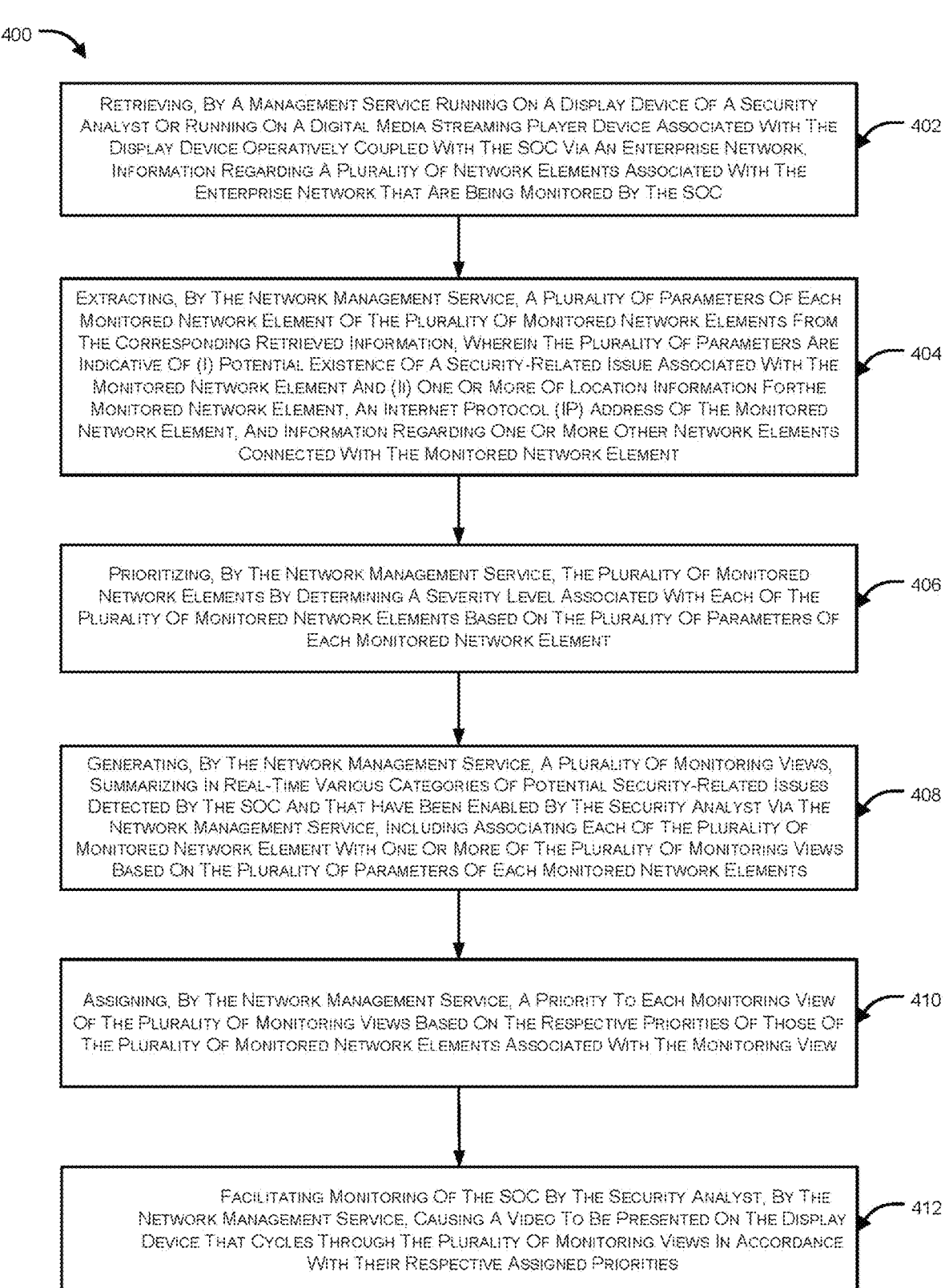

RETRIEVING, BY A MANAGEMENT SERVICE RUNNING ON A DISPLAY DEVICE OF A SECURITY ANALYST OR RUNNING ON A DIGITAL MEDIA STREAMING PLAYER DEVICE ASSOCIATED WITH THE DISPLAY DEVICE OPERATIVELY COUPLED WITH THE SOC VIA AN ENTERPRISE NETWORK, INFORMATION REGARDING A PLURALITY OF NETWORK ELEMENTS ASSOCIATED WITH THE ENTERPRISE NETWORK THAT ARE BEING MONITORED BY THE SOC — 402

EXTRACTING, BY THE NETWORK MANAGEMENT SERVICE, A PLURALITY OF PARAMETERS OF EACH MONITORED NETWORK ELEMENT OF THE PLURALITY OF MONITORED NETWORK ELEMENTS FROM THE CORRESPONDING RETRIEVED INFORMATION, WHEREIN THE PLURALITY OF PARAMETERS ARE INDICATIVE OF (I) POTENTIAL EXISTENCE OF A SECURITY-RELATED ISSUE ASSOCIATED WITH THE MONITORED NETWORK ELEMENT AND (II) ONE OR MORE OF LOCATION INFORMATION FOR THE MONITORED NETWORK ELEMENT, AN INTERNET PROTOCOL (IP) ADDRESS OF THE MONITORED NETWORK ELEMENT, AND INFORMATION REGARDING ONE OR MORE OTHER NETWORK ELEMENTS CONNECTED WITH THE MONITORED NETWORK ELEMENT — 404

PRIORITIZING, BY THE NETWORK MANAGEMENT SERVICE, THE PLURALITY OF MONITORED NETWORK ELEMENTS BY DETERMINING A SEVERITY LEVEL ASSOCIATED WITH EACH OF THE PLURALITY OF MONITORED NETWORK ELEMENTS BASED ON THE PLURALITY OF PARAMETERS OF EACH MONITORED NETWORK ELEMENT — 406

GENERATING, BY THE NETWORK MANAGEMENT SERVICE, A PLURALITY OF MONITORING VIEWS, SUMMARIZING IN REAL-TIME VARIOUS CATEGORIES OF POTENTIAL SECURITY-RELATED ISSUES DETECTED BY THE SOC AND THAT HAVE BEEN ENABLED BY THE SECURITY ANALYST VIA THE NETWORK MANAGEMENT SERVICE, INCLUDING ASSOCIATING EACH OF THE PLURALITY OF MONITORED NETWORK ELEMENT WITH ONE OR MORE OF THE PLURALITY OF MONITORING VIEWS BASED ON THE PLURALITY OF PARAMETERS OF EACH MONITORED NETWORK ELEMENTS — 408

ASSIGNING, BY THE NETWORK MANAGEMENT SERVICE, A PRIORITY TO EACH MONITORING VIEW OF THE PLURALITY OF MONITORING VIEWS BASED ON THE RESPECTIVE PRIORITIES OF THOSE OF THE PLURALITY OF MONITORED NETWORK ELEMENTS ASSOCIATED WITH THE MONITORING VIEW — 410

FACILITATING MONITORING OF THE SOC BY THE SECURITY ANALYST, BY THE NETWORK MANAGEMENT SERVICE, CAUSING A VIDEO TO BE PRESENTED ON THE DISPLAY DEVICE THAT CYCLES THROUGH THE PLURALITY OF MONITORING VIEWS IN ACCORDANCE WITH THEIR RESPECTIVE ASSIGNED PRIORITIES — 412

REMOTE MONITORING OF A SECURITY OPERATIONS CENTER (SOC)

CROSS REFERENCE TO RELATED APPLICATION

The present application is a continuation of U.S. patent application Ser. No. 16/452,667 entitled "REMOTE MONITORING OF A SECURITY OPERATIONS CENTER (SOC)", and filed Jun. 26, 2019 by May et al. The entirety of the aforementioned reference is incorporated herein by reference for all purposes.

COPYRIGHT NOTICE

BACKGROUND

Field

Embodiments of the present invention generally relate to network security, network security investigation and monitoring systems. In particular, embodiments of the present invention relate to systems and methods to facilitate remote monitoring of a Security Operations Center (SOC) through a mobile application that may be running on a smart television (TV), a conventional television, a monitor, a mobile device or a digital streaming media player associated therewith.

Description of the Related Art

A Security Operations Center (SOC) (also referred to as a security defense center, a security analytics center, a network security operations center, a security intelligence center, a cyber security center, a threat defense center, a security intelligence and operations center) is a real, centralized or distributed physical facility or a virtual organization dedicated and organized to monitor and analyze an enterprise's security posture on an ongoing basis. Security analysts (including alert analysts, incident responders, subject matter experts/hunters and SOC managers) and other information security staff (also referred to as the SOC team), among other things, mitigate, prevent, detect, assess and respond to cyber security threats and incidents associated with enterprise information technology (IT) infrastructure, systems, information assets and computer systems (hosts). For example, the SOC team may analyze the activity on networks, servers, endpoints, databases, applications, websites, and other systems, looking for anomalous activity that could be indicative of a security incident or compromise. The SOC team is also typically responsible for resolving threats to the enterprise information technology (IT) systems and information assets.

Members of the SOC team continuously monitor, investigate and analyze known and existing threats to study emerging risks with use of the latest technology, like threat intelligent systems, which can be helpful in improving decisions and defense mechanisms. The SOC devices collect data from within the organization (e.g., incident reports from other IT departments, log and event sources, help desk and security intelligence platforms) and correlate the data with information from external sources, such as threat briefs, and vulnerability alerts, which provide insights into vulnerabilities and facilitate staying on top of evolving cyber threats. Through this activity, the SOC team can analyze networks, servers, and databases, thereby ensuring timely detection of security incidents. Thus, continuous monitoring by an SOC provides an organization with an advantage to defend against intrusions regardless of the type of attack at any time.

At present, managing the SOC and collecting, aggregating, managing, filtering, prioritizing and organizing the voluminous security-relevant data, which may include tens or hundreds of millions of security events per day, and security-relevant data feeds is a cumbersome task. Too many alerts of little consequence or false-positives may lead to analyst alert fatigue. Furthermore, remote monitoring of various SOC room "views" (e.g., vulnerability summaries, threat maps, compromised hosts and the like) across the enterprise network is currently an overly complicated task as the SOC room views cannot simply be presented on a TV (or a tablet computer or a smartphone), for example, but rather requires a personal computer or laptop, which hosts a web browser and cycles through various browser tabs or the like, to be connected to the TV.

SUMMARY

Systems and methods are described for remote monitoring of a Security Operations Center (SOC) via a mobile application. According to one embodiment, a management service running on a display device of a security analyst or running on a digital media streaming player device associated with the display device operatively coupled with the SOC via an enterprise network can be used to remotely monitor information regarding multiple monitored network elements of the enterprise network. The information is retrieved by the management service from one or more network security devices of the enterprise network. The management service extracts parameters of each monitored network element from the corresponding retrieved information, which are indicative of (i) potential existence of a security-related issue associated with the monitored network element and (ii) one or more of location information for the monitored network element, an Internet Protocol (IP) address of the monitored network element, and information regarding one or more other network elements connected with the monitored network element. Further, the management service prioritizes the monitored network elements by determining a severity level associated with the monitored network elements based on the parameters and generates multiple monitoring views, which summarize in real-time various categories of potential security-related issues detected by the SOC and which have been enabled by the security analyst via the management service. Each of the monitored network element are associated with one or more of the monitoring views based on their respective parameters. The management service assigns a priority to each monitoring view based on the respective priorities of those of the monitored network elements associated with the monitoring view. Monitoring of the SOC by the security analyst is facilitated by the management service by causing a video to be presented on the display device that cycles through the monitoring views in accordance with their respective assigned priorities.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 2B represents various Application Programming Interface (API) calls in accordance with an embodiment of the present invention.

FIGS. 3A-F illustrate exemplary representations presented in Graphical User Interface (GUI) of a security investigation device in accordance with an embodiment of the present invention.

FIG. 4 is a flow diagram illustrating a process for monitoring by a security investigation device in accordance with an embodiment of the present invention.

DETAILED DESCRIPTION

Figure 1:
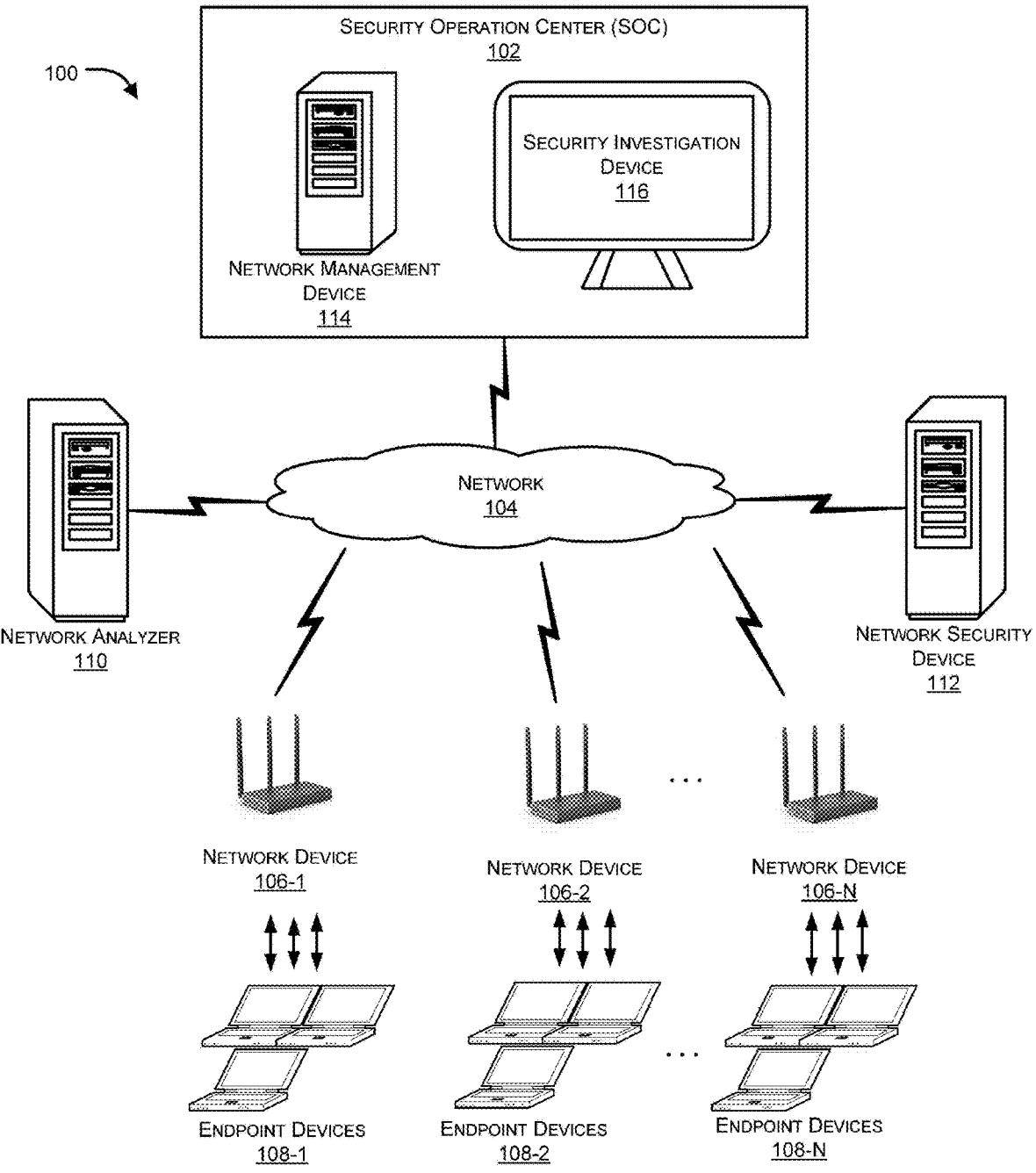
FIG. 1 is a simplified network architecture in which aspects of the present invention can be implemented in accordance with an embodiment of the present invention.

Systems and methods are described for remote monitoring of security operations of a cyber security fabric through a management service running on a security investigation device such as a display device of a security analyst. According to one embodiment, a remote Security Operations Center (SOC) can monitor multiple network elements associated with an enterprise network. A management service running on a display device of a security analyst or running on a digital media streaming player device associated with the display device operatively coupled with the SOC via the enterprise network, retrieves information regarding the network elements. Further, the management service extracts parameters of each monitored network element from the corresponding retrieved information. The parameters may be indicative of (i) potential existence of a security-related issue associated with the monitored network element and (ii) one or more of location information for the monitored network element, an Internet Protocol (IP) address of the monitored network element, and information regarding one or more other network elements connected with the monitored network element. The management service prioritizes the monitored network elements by determining a severity level associated with each monitored network element based on the parameters of each monitored network element and generates multiple monitoring views. The monitoring views summarize in real-time various categories of potential security-related issues detected by the SOC, which have been enabled by the security analyst via the management service. Each of the monitored network elements is associated with one or more of the monitoring views based on their respective parameters. Further, the management service assigns a priority to each monitoring view based on the respective priorities of those of the monitored network elements associated with the monitoring view. The management service facilitates monitoring of the SOC by the security analyst by causing a video to be presented on the display device that cycle through the monitoring views in accordance with their respective assigned priorities.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

FIG. 1 is a simplified network architecture 100 in which aspects of the present invention can be implemented in accordance with an embodiment of the present invention. In context of architecture 100, a security operations center (SOC) 102 coupled to an enterprise network 104, monitors various network elements associated with network 104 such as network security device 112, network devices 106-1, 106-2 . . . 106-N (which may be individually referred to as network device 106 and may be collectively referred to as network devices 106, herein) and endpoint devices 108-1, 108-2 . . . 108-N (which may be individually referred to as endpoint device 108 and may be collectively referred to as endpoint devices 108, herein).

Those skilled in the art will appreciate that, network 104 in architecture 100 can be a wireless network, a wired network or a combination thereof that can be implemented as one of the different types of networks, such as an Intranet, a Local Area Network (LAN), a Wide Area Network (WAN), Internet, and the like. Further, network 104 can either be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

According to an embodiment, SOC 102 can include a network management device 114 and a security investigation device 116 used by a security analyst. Network management device 114 can facilitate deployment and configuration management of numerous network devices 106, including switches, access points, gateway devices and the like. In one embodiment, network management device 114 may collect information regarding multiple network elements associated with network 104 that are being monitored by SOC 102.

In one embodiment, security investigation device 116 can be remote from SOC 102 (e.g., located in an office outside of SOC 102, but still connected to the enterprise network 104), thereby allowing the security analyst access to conveniently and efficiently monitor network activities/events as described further below. There are a variety of configurations contemplated for security investigation device 116. In one embodiment, there are two main components of security investigation device 116, a display screen and a digital streaming media player, which may be integrated within one device (e.g., a smart TV, a tablet computer, or a smartphone) or distributed among multiple devices (e.g., (i) a display device, such as a conventional TV or monitor and (ii) a digital streaming media device coupled to the display device). As described further below, security investigation device 116 facilitates presentation of SOC room views to the security analyst via a management service or an application such as a mobile app, which directly or indirectly collects information from network security device 112, network analyzer 110, network management device 114 and other security monitoring solutions associated with enterprise network 104. The security monitoring solutions can be Security Information and Event Monitoring (SIEM) devices/appliances or security intelligence platforms.

Examples of network security device 112 include, but are not limited to, firewall appliances, sandboxing appliances, endpoint security systems using sandbox mechanisms, and the like. Further, endpoint devices 108 may include, but are not limited to, personal computers, smart devices, web-enabled devices, hand-held devices, laptops, mobile phones, and the like to allow users to interact with resources internal to and external to network 104.

According to an embodiment, the management service is in the form of a mobile app running on iOS or the Android mobile operating system of security investigation device 116 or on a digital streaming media device, e.g., an Apple TV, an-Amazon Fire TV Cube, an Nvidia Shield Android TV streaming box and the like, associated therewith. The management service may retrieve information regarding multiple network elements associated with network 104 that are being monitored by SOC 102 directly or indirectly from the network elements. In an implementation, the information regarding the network elements can be retrieved by querying network elements via exposed application programming interfaces (APIs). Alternatively or additionally, some portion of all of the information regarding the network elements may be retrieved from network management device 114. The management service can also extract parameters of each monitored network element from the corresponding retrieved information. The parameters can be indicative of (i) potential existence of a security-related issue associated with the monitored network element and (ii) one or more of location information for the monitored network element, an Internet Protocol (IP) address of the monitored network element, and information regarding one or more other network elements connected with the monitored network element.

Further, the management service may prioritize the monitored network elements by determining a severity level associated with each monitored network element based on corresponding parameters. Alternatively, the severity level associated with each network element can be analyzed by network analyzer 110 operatively coupled with the network elements and the SOC 102. Multiple monitoring views are then generated, which summarize in real-time various categories of potential security-related issues detected by network management device 114 or SOC 102, and which views have been selectively enabled by the security analyst via the management service. Each monitored network element may be associated with one or more monitoring views based on corresponding parameters of the each monitored network element. For example, a particular monitored network element (e.g., endpoint device 108) may be associated with a list of compromised hosts (e.g., as a result of network security device 112 observing potential communications by the particular monitored network element with a known botnet command and control server) and a threat map (e.g., as a result of endpoint security protection software running thereon reporting the existence of a potential virus).

In one embodiment, the management service assigns a priority to each monitoring view based on the respective priorities of the monitored network elements associated with the monitoring view and facilitates monitoring of SOC 102 by the security analyst by causing a video to be presented on security investigation device 116. In an implementation, the video presented on the display of security investigation device 116 cycles through the monitoring views in accordance with their respective assigned priorities such that security investigation device 116 periodically presents each monitoring view. In another embodiment, a security analyst is provided with the ability to view various levels of detail (e.g., via drill-down and/or summary views) for the various monitoring views and may navigate among the monitoring views via a Graphical User Interface associated with security investigation device 116. In one of the monitoring views, for example, the network management service can present topological representation of SOC 102.

According to an embodiment, one of the network elements includes a network security device 112 to detect anomalous behavior on the part any of the network elements so that the detected anomaly can be acted upon (e.g., logged, alerted and/or remediated). The management service can then use information regarding a detected anomaly to retrieve parameters of the network element at issue so that the monitoring view can be generated and prioritized based on the detected anomaly. In an implementation, in response to receiving an indication regarding a detected anomaly, the management service can flag the network element associated with the anomaly and can present the network element as a flagged network element in a monitoring view.

Figure 2A:
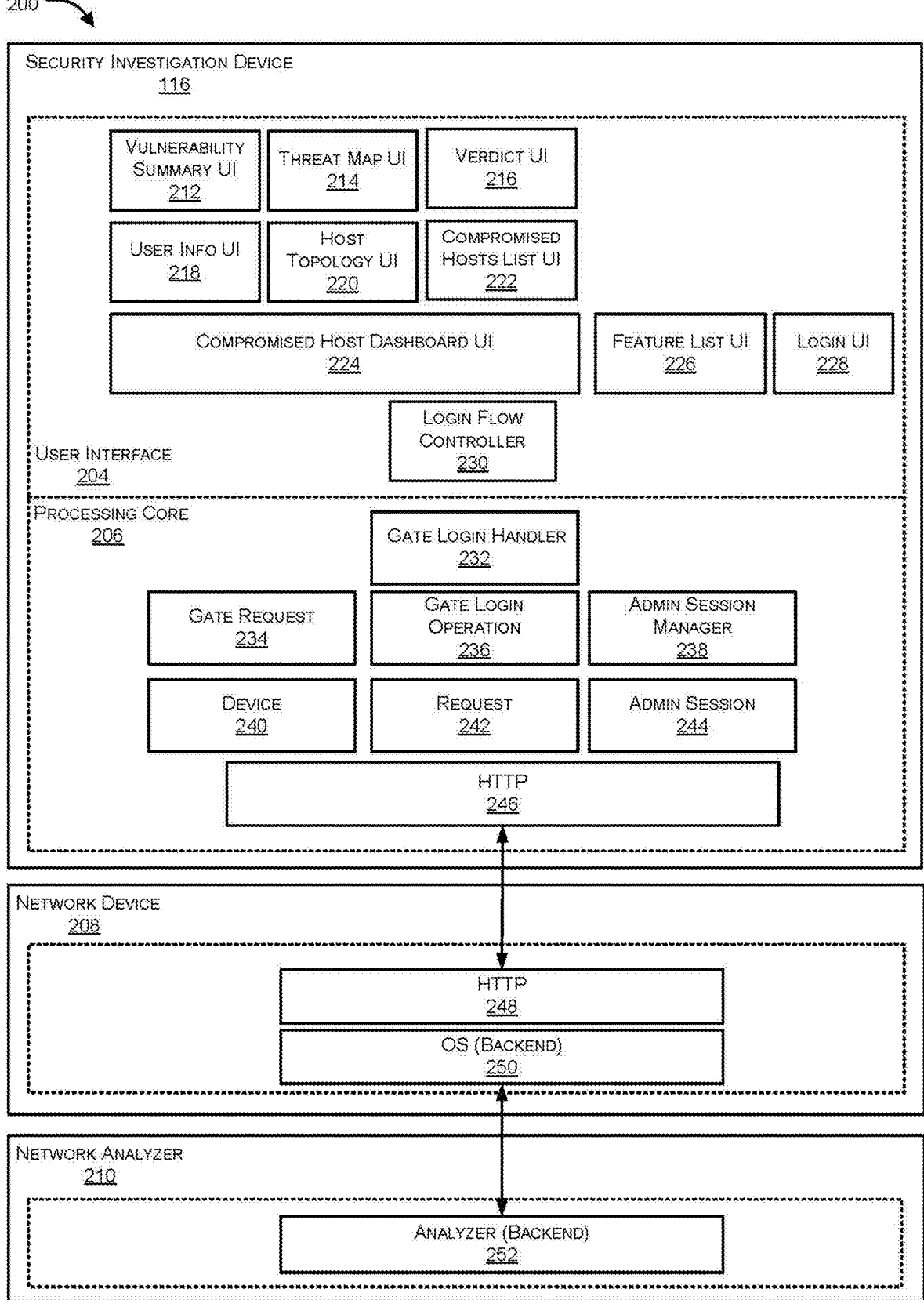
FIG. 2A is a block diagram illustrating functional components of a security investigation device in accordance with an embodiment of the present invention.

FIG. 2A is a block diagram 200 illustrating functional components of a security investigation device 116 in accordance with an embodiment of the present invention. In the context of the present example, security investigation device 116 includes a user interface 204 and a processing core 206. Security investigation device 116 can communication with network devices associated with enterprise network 104 via processing core 206. For example, security investigation device 116 can send and receive Hypertext Transfer Protocol (HTTP) requests and responses to and from a connected network device 208 (e.g., network management device 114), which may be coupled with a network analyzer 210 that analyzes security levels and/or priorities associated with the monitored network elements of enterprise network 104. According to an example, security investigation device 116 can act as an application container that contains an application to collect data associated with the monitored network elements from network device 208. The application can be a management service that can run continuously on a processor of security investigation device 116.

User interface 204 can have components such as a vulnerability summary user interface (UI) 212 that presents collected vulnerability information in summary form. In one embodiment, the vulnerabilities generally represent known flaws in software or system configuration of a network element that can be used by attackers to gain unauthorized access to the network element. As such, by proactively scanning for vulnerabilities of monitored network elements within the enterprise network 104, vulnerabilities can be found and remediated (e.g., installation of security updates to an operating system or other software, changing system configuration settings, setting or changing passwords, and/or removing/upgrading outdated software) before they can be exploited by attackers. Discovered vulnerabilities can be rated or scored based on the perceived risk/severity to the network element at issue and/or to the enterprise network 104 as a whole. For example, the security vulnerability level for a particular network element of the monitored network elements may be zero if no known vulnerabilities are found, a low value if only a few (low risk/severity) vulnerabilities are found, or a high value if a relatively large number of vulnerabilities are found in the network element or if those found are high risk/severity vulnerabilities. Alternatively or additionally, color or sound may be indicative of the relative severity/risk relating to the evaluated vulnerability of a particular network element. For example, a network element having an assessed high vulnerability may be displayed in red, a network element having an assessed medium level of vulnerability may be displayed in orange, a network element having an assessed low level of vulnerability may be displayed in yellow and a network element having no detected vulnerabilities may be displayed in green. In some embodiments, the network element may have no known security vulnerability if no vulnerabilities with a risk level over a particular risk threshold have been discovered. In some embodiments, the security vulnerability level may be simply a pass/fail determination.

User interface 204 may include a threat map UI 214 that can visually represent potential threats affecting instances and software services of the monitored network elements. User interface 204 can also include a verdict UI 216 that can respond with a detection verdict or reputational information associated with the respective network elements. Further, user interface 204 can include a user information UI 218 to display information associated with users of the network elements, a host topology UI 220 to display in hierarchical form the position of the host device with respect to various network elements and a feature list UI 226 to list various functions and features of network elements.

Further, user interface 204 can include a compromised hosts list UI 222 to display the network elements or the hosts, that are suspected of or confirmed to be compromised. For example, observations by one or more network security devices (e.g., network security device 112) may reflect a high confidence that attackers have gained unauthorized access to a particular endpoint device or may represent highly suspicious network activity indicative of the particular endpoint device being compromised. In one embodiment the compromised hosts list UI 222 presents those of the monitored endpoint device (hosts) that are suspected of or confirmed to be compromised in the form of a list. User interface 204 can also include a compromised host dashboard UI 224 that can have a variety of gauges and indicators and can provide useful diagnostic information about the "health" of the monitored network elements. Other exemplary user interfaces can include login UI 228 and login flow controller 230 to handle login or access of the network administrator or security analyst on security investigation device 116.

According to an embodiment, the processing core 206 may be implemented as a combination of hardware and software or firmware programming (for example, programmable instructions) to implement one or more functionalities of core 206. In the context of the present example, such combinations of hardware and software or firmware programming may be implemented in several different ways. For example, the programming for the core may be processor executable instructions stored on a non-transitory machine-readable storage medium and the hardware for core 206 may include a processing resource (for example, one or more processors), to execute such instructions. In the examples, the machine-readable storage medium may store instructions that, when executed by the processing resource, implement core 206. In such examples, security investigation device 116 can include the machine-readable storage medium storing the instructions and the processing resource to execute the instructions, or the machine-readable storage medium may be separate but accessible to security investigation device 116 and the processing resource. In other examples, the processing core 206 may be implemented by electronic circuitry.

In an embodiment, processing core 206 includes an HTTP component 246 that can interact with HTTP component 248 of network device 208 and define how information can be formatted and transmitted between network device 208 and processing core 206 of security investigation device 116.

According to an implementation, processing core 206 can include a request component 242, a gate login operation component 236 and a gate login handler component 232 to handle authentication of login requests from the network administrator or the security analyst and to create an authentication specific flow and action handler. In an example, gate login operation component 236 can manage the login process to log into security investigation device 116 to determine and detect security vulnerabilities of the network elements.

Processing core 206 can also include a device component 240 and a gate request component 234 to handle requests transmitted between security investigation device 116 and the network elements for receiving information of the network elements. Further, processing core 206 can include an admin session component 244 and an admin session manager component 238 to manage various administrator sessions for monitoring of network elements.

In an implementation, security investigation device 116 communicates with network device 208 by exchanging information using HTTP component 246 and HTTP component 248. Network device 208 can have an OS (backend) component 250 to support receiving of API calls for processing information regarding network device 208 that can be transmitted to security investigation device 116.

In an implementation, network analyzer 210 has an analyzer (backend) component 252 through which security status information of various of the monitored network elements collected by network analyzer 210 can be communicated to network device 208. For example, network analyzer 210 determine and analyze the security health of the monitored network elements. For example, analyzer 252 may process information collected from the monitored network elements for purposes of declaring network elements in the range of 'safe', 'moderately dangerous' and/or 'dangerous'. In an example, analyzer component 252 can receive requests directly or indirectly from security investigation device 116 and in response thereto can provide the current state of its analysis in relation to the monitored network elements.

FIG. 2B represents various Application Programming Interface (API) calls in accordance with an embodiment of the present invention. According to an embodiment, the management service running on security investigation device 116 can make use of custom Representational State Transfer (REST)ful APIs provided by network management device 114 and/or network security device 112 to retrieve information for generation of the various monitoring views, summary views and/or drill-down detail screens.

Block 260 represents a login check API (/logincheck). According to one embodiment, this API can provide information regarding logins performed on the monitored network elements. For example, for each network element information regarding successful and/or failed login attempts may be tracked along with a timestamp associated with the successful and/or failed login attempt.

Block 262 represents a web-UI/State API (/web-ui/state). In one embodiment, this API provides information regarding the current state of a particular monitored network element. For example, this API may return information regarding the current user permissions, a list of virtual domains (VDOMs), enabled features and the like.

Block 264 represents a system/cooperative security fabric (CSF) API (/system/CSF). In one embodiment, network security devices deployed within the enterprise network 104 may form a cooperative security fabric (CFS), for example, based on hierarchical interconnections among the network security devices. The CSF may provide efficiencies in terms of collecting information regarding multiple monitored network elements as the management service may simply query the root of a subtree of the CSF of interest rather than having to communicate with each network security device within the subtree individually. In one embodiment, this API call can be used to retrieve a full tree of downstream network devices registered to the SOC. The access group of the block 264 is SECFABGRP.

Block 266 represents a view/statistics API (/view/statistics). In one embodiment, this API call is made with query parameters (view filters), e.g., Indicators of Compromise (IoC), IoC-Blacklist, to retrieve both drill-down and summary data for viewing (e.g., both real-time and historical data). The access group of block 206 is VIEWGRP.

Block 268 represents a user/device API (/user/device). In one embodiment this API is for retrieving a list of detected users and/or devices associated with the enterprise network 104. The access group of block 268 is AUTHGRP.

Block 270 represents an endpoint-control/record list API (/endpoint-control/record-list). In one embodiment, this API is used for listing endpoint records. The access group of block 270 is UTMGRP.ENDPOINT-CONTROL.

Block 272 represents a geolocation API (/geoip/geoip-query). In one embodiment, this API can be used for retrieving the location details for Internet Protocol (IP) addresses via a GeoIP lookup tool/service. The access group of block 272 is SYSGRP.CFG.

FIGS. 3A-F illustrate exemplary screen shots of those presented in Graphical User Interface (GUI) of a security investigation device in accordance with an embodiment of the present invention.

Figure 3A:
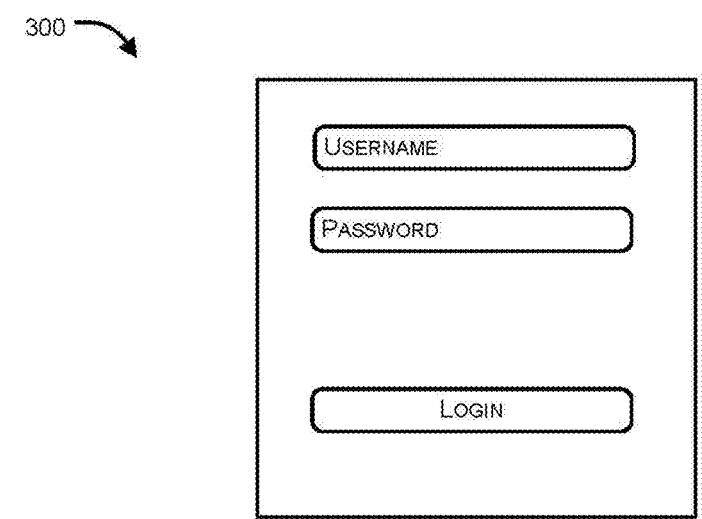

FIG. 3A illustrates a login screen 300 through which a user, network administrator or security analyst can login to management service running on security investigation device in accordance with an embodiment of the present invention. In the context of the present example, the user can log into security investigation device by providing login details such as a user name and a password. Upon authentication of the login details, the user is validated and the login is successful so that the user can view information relating to the monitored network elements.

Figure 3B:
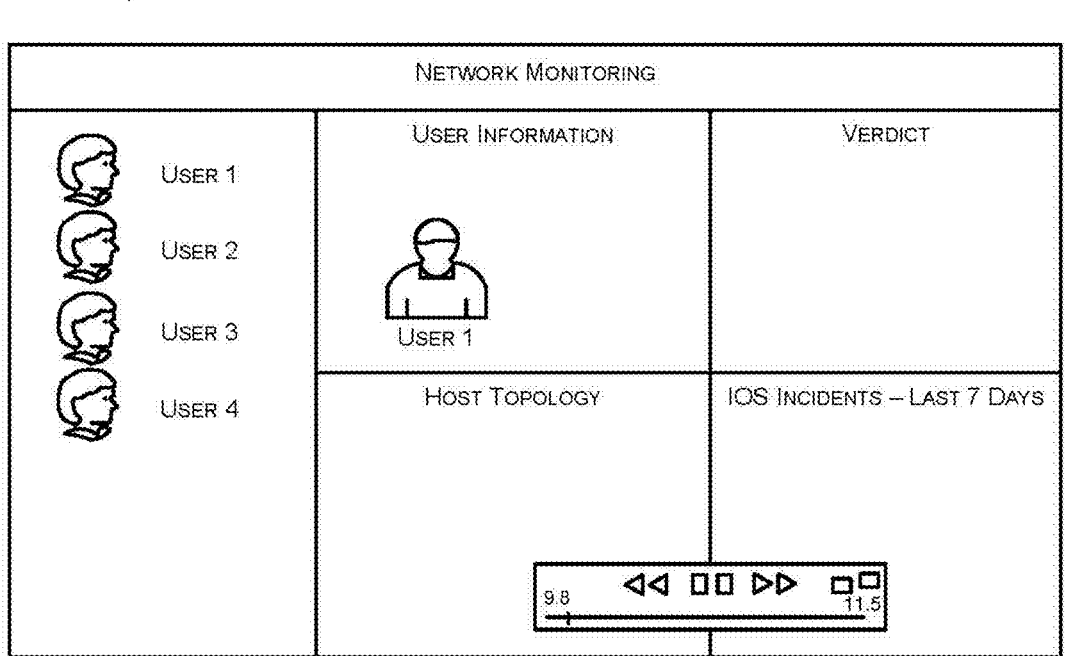

FIG. 3B illustrates a network monitoring screen 320 for network monitoring statistics being displayed on the security investigation device in accordance with an embodiment of the present invention. The management service can directly or indirectly request/query information regarding various monitored network elements, such as network devices and network security devices connected to SOC to retrieve security details for generating multiple monitoring views to be displayed to the user. The display can cycle through multiple monitoring views and the user can disable/pause cycling if there is any critical view that needs attention. Typically, views are arranged and cycled in equal priority. Each view is customized for better display on multiple display devices such as TV, smartphone, etc. In the context of the present example, information regarding multiple users can be cycled through and corresponding to each user, views relating to user information, network security verdict, host topology and IOS incidents for the past 7 days are displayed simultaneously. Additionally, stop, forward and rewind buttons are provided for reviewing the information associated with these views.

FIG. 3C illustrates a network monitoring screen shot 340 for viewing a list of compromised hosts via security investigation device in accordance with an embodiment of the present invention. In context of the present example, information related to compromised hosts is presented. In one embodiment, the presentation for cycling through the multiple monitoring views can be initiated by selecting the start presentation button and the explorer button can be used to explore various other of multiple monitoring views. The logout button can be used to logout from the management service.

Figure 3D:
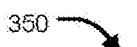

FIG. 3D illustrates a compromised hosts security rating screen 350 for network monitoring with a list of compromised hosts being displayed along with their security rating on security investigation device in accordance with an embodiment of the present invention. In the context of the present example, a security rating can be indicative of level of security risk and/or vulnerability of a network element. For example, if the security rating of a network element is greater than a threshold value then that network element may be considered 'dangerous'. If the security rating of the network element is within a threshold value range then that network element is considered 'suspicious' or 'moderately dangerous' otherwise, the network element is considered 'safe'.

Figure 3E:
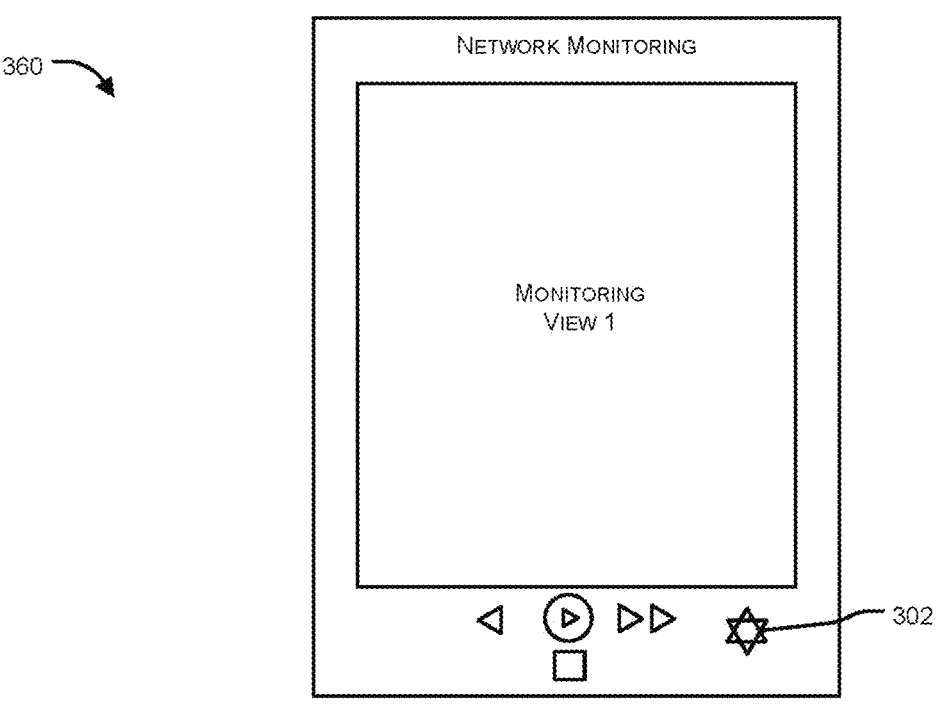
Figure 3F:
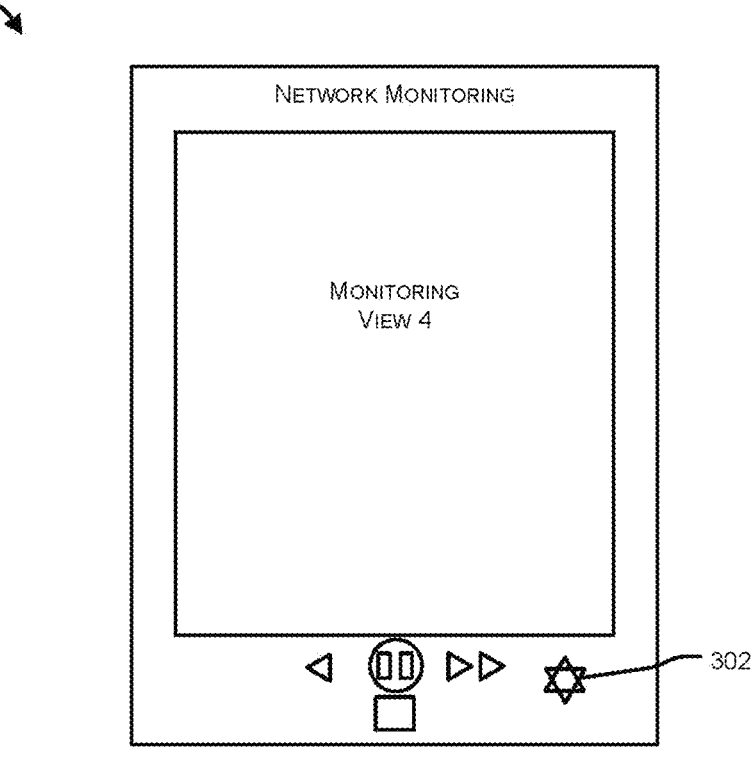

FIGS. 3E-F illustrate an examples 360 and 370 for network monitoring where user activity is performed using app or management service. Example 360 indicates multiple monitoring views can be displayed using a play button. For example, on pressing play button, monitoring view 1 to monitoring view 5 can be displayed periodically.

Example 370 indicates monitoring views can be paused by using a pause button. For example, if the user wishes to stop the video of multiple monitoring views and wants to analyze monitoring view 4, the user can pause at monitoring view 4 by pressing the pause button.

In an example, certain views can be prioritized over other views based on severity or criticality of a particular security related issue meeting a particular threshold by pressing button 302.

FIG. 4 is a flow diagram illustrating a process for monitoring by a security investigation device in accordance with an embodiment of the present invention.

In context of the present example, at block 402, a management service, running on a display device of a security analyst or on a television (TV) operating system (e.g., tvOS) of a digital media streaming player device associated with the display device operatively coupled with an SOC via an enterprise network, retrieves information regarding plurality of network elements associated with the enterprise network that are being monitored by the SOC. In one embodiment, the management service is a third-party app developed for the TV OS and may be purchased or downloaded via an app store.

At block 404, the network management service extracts a plurality of parameters of each monitored network element of the plurality of monitored network elements from the corresponding retrieved information. The plurality of the parameters are indicative of (i) potential existence of a security-related issue associated with the monitored network element and (ii) one or more of location information for the monitored network element, an Internet Protocol (IP) address of the monitored network element, and information regarding one or more other network elements connected with the monitored network element.

At block 406, the network management service prioritizes the plurality of monitored network elements by determining a severity level associated with each of the plurality of monitored network elements based on the plurality of parameters of each monitored network element.

At block 408, the network management service generates a plurality of monitoring views, summarizing in real-time various categories of potential security-related issues detected by the SOC and that have been enabled by the security analyst via the network management service. Each of the plurality of monitored network element are associated with one or more of the plurality of monitoring views based on the plurality of parameters of each monitored network elements.

At block 410, the network management service assigns a priority to each of monitoring view of the plurality of monitoring views based on the respective priorities of those of the plurality of monitored network elements associated with the monitoring view.

At block 412, the network management service facilitates monitoring of the SOC by the security analyst and causes a video to be presented on the display device that cycles through the plurality of monitoring views in accordance with their respective assigned priorities.

Figure 5:
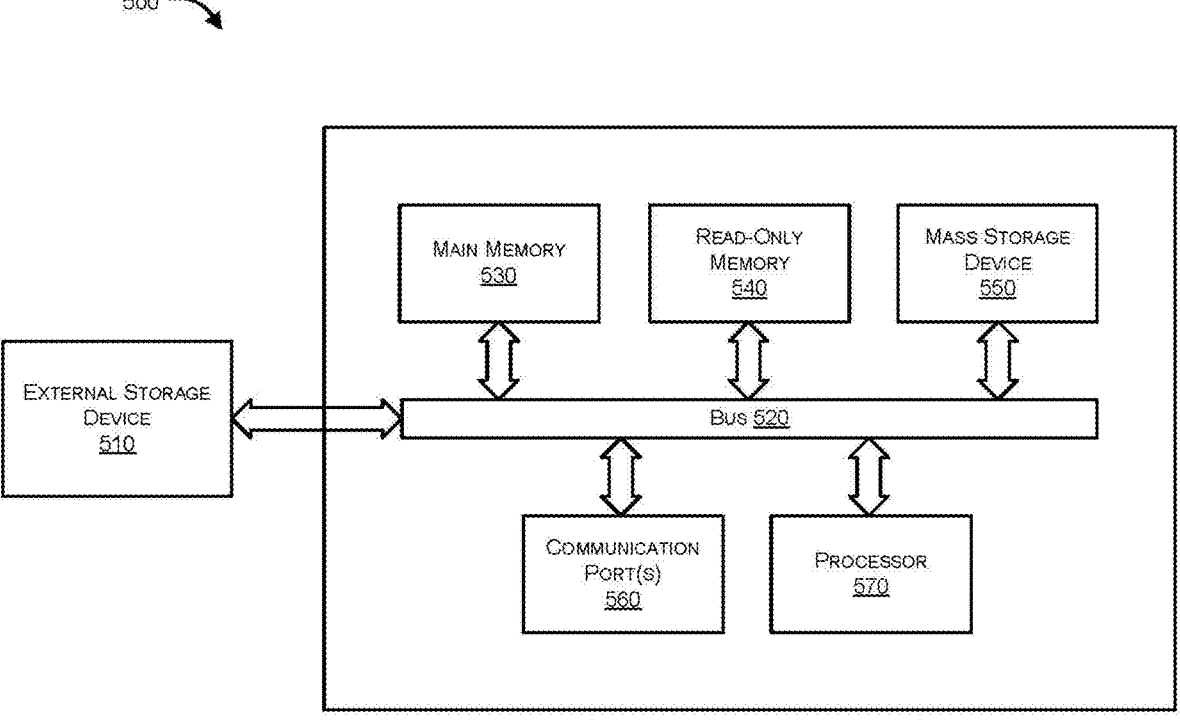
FIG. 5 illustrates an exemplary computer system in which or with which embodiments of the present invention may be utilized.

FIG. 5 illustrates an exemplary computer system 500 in which or with which embodiments of the present invention may be utilized.

As shown in FIG. 5, computer system includes an external storage device 510, a bus 520, a main memory 530, a read only memory 540, a mass storage device 550, a communication port 560, and a processor 570. Computer system may represent some portion of SOC 102, network management device 114 or security investigation device 116.

Those skilled in the art will appreciate that computer system 500 may include more than one processor 570 and communication ports 560. Examples of processor 570 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 570 may include various modules associated with embodiments of the present invention.

Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 560 may be chosen depending on a network, such a Local Area Network (LAN), Wide Area Network (WAN), or any network to which computer system connects.

Memory 530 can be Random Access Memory (RAM), or any other dynamic storage device commonly known in the art. Read only memory 540 can be any static storage device(s) e.g., but not limited to, a Programmable Read Only Memory (PROM) chips for storing static information e.g. start-up or BIOS instructions for processor 570.

Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 520 communicatively couples processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with computer system. Other operator and administrative interfaces can be provided through network connections connected through communication port 560. External storage device 510 can be any kind of external hard-drives, floppy drives, IOMEGA® Zip Drives, Compact Disc—Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method for facilitating remote Security Operations Center (SOC) monitoring:

retrieving, by a management service executing on a processing resource, information regarding a plurality of devices included within a network that are being monitored by the SOC;

generating, by the management service executing on the processing resource, a first monitoring view to display first categories of potential network security-related issues detected by the SOC in real-time and a second monitoring view to display second categories of potential network security-related issues detected by the SOC in real-time;

associating a first plurality of monitored devices with the first monitoring view based on the first category of parameters shared by the first plurality of monitored devices and a second plurality of monitored devices with the second monitoring view based on the second category of parameters shared by the second plurality of monitored devices, wherein the first category of parameters comprises a first network security related issue associated with the first plurality of monitored devices and the second category of parameters comprises a second network security related issue associated with the second plurality of monitored devices that is different than the first network security related issue;

assigning, by the management service executing on the processing resource, a first priority to the first monitoring view based on a first severity level corresponding to each of the first plurality of monitored devices and a second priority to the second monitoring view based on a second severity level corresponding to each of the second plurality of monitored devices; and facilitating monitoring of the SOC, by the management service executing on the processing resource, causing a video to be presented on a display device that cycles through the first and second monitoring views in accordance with the first and second assigned priorities and under control of a real-time user input provided via a graphical user interface.

2. The method of claim 1, wherein the processing resource is incorporated in a device selected from a group consisting of: the display device, and a digital media streaming player device associated with the display device operatively coupled with the SOC via an enterprise network.

3. The method of claim 1, the method further comprising:

extracting, by the management service executing on the processing resource, parameters of each monitored device of the plurality of monitored devices from the corresponding retrieved information, prioritizing, by the management service executing on the processing resource, the plurality of monitored devices by determining a severity level associated with each of the plurality of monitored devices based on the parameters of each monitored device; and wherein the display device periodically presents each monitoring view of the plurality of monitoring views.

4. The method of claim 1, wherein the display device comprises a television (TV) and wherein the management service comprises an application running on a TV operating system of the display device.

5. The method of claim 1, wherein the first device comprises a network security device, which detects an anomaly in behavior of any of the plurality of devices.

6. The method of claim 5, wherein the network security device reports the detected anomaly to the management service responsive to receipt of a request from the management service.

7. The method of claim 6, wherein in response to receiving an indication of the detected anomaly, the management service flags the device associated with the anomaly and presents the device as a flagged device in a monitoring view of the plurality of monitoring views.

8. The method of claim 1, wherein the information regarding the plurality of devices is retrieved by querying a network security device through one or more application programming interface (API) calls.

9. The method of claim 1, wherein a system analyst navigates through the plurality of monitoring views via input to the management service using a Graphical User Interface associated with the display device.

10. The method of claim 1, wherein the management service presents a topological representation of an enterprise network.

11. The method of claim 1, wherein a third parameter comprises first location information associated with the first plurality of monitored devices and a fourth parameter comprises a second location information associated with the second plurality of monitored devices.

12. A non-transitory computer-readable storage medium embodying a set of instructions, which when executed by one or more processors of a display device or a digital media streaming player devices associated with the display device, causes the one or more processors to perform a method for remote Security Operations Center (SOC) monitoring, said method comprising:

retrieving, by a management service executing on a processing resource, information regarding a plurality of devices included within a network that are being monitored by the SOC;

generating, by the management service executing on the processing resource, a first monitoring view to display first categories of potential network security-related issues detected by the SOC in real-time and a second monitoring view to display second categories of potential network security-related issues detected by the SOC in real-time;

associating a first plurality of monitored devices with the first monitoring view based on the first category of parameters shared by the first plurality of monitored devices and a second plurality of monitored devices with the second monitoring view based on the second category of parameters shared by the second plurality of monitored devices, wherein the first category of parameters comprises a first network security related issue associated with the first plurality of monitored devices and the second category of parameters comprises a second network security related issue associated with the second plurality of monitored devices that is different than the first network security related issue;

assigning, by the management service executing on the processing resource, a first priority to the first monitoring view based on a first severity level corresponding to each of the first plurality of monitored devices and a second priority to the second monitoring view based on a second severity level corresponding to each of the second plurality of monitored devices; and facilitating monitoring of the SOC, by the management service executing on the processing resource, causing a video to be presented on a display device that cycles through the first and second monitoring views in accordance with the first and second assigned priorities and under control of a real-time user input provided via a graphical user interface.

13. The non-transitory computer readable storage medium of claim 12 further embodying a set of instructions, which when executed by the one or more processors of the display device or the digital media streaming player devices associated with the display device, causes the one or more processors to perform the method for remote Security Operations Center (SOC) monitoring further comprising:

extracting parameters of each monitored device of the plurality of monitored devices from the corresponding retrieved information;

prioritizing the plurality of monitored devices by determining the severity level associated with each of the plurality of monitored devices based on the parameters of each monitored device; and wherein the display device periodically presents each monitoring view of the plurality of monitoring views.

14. The non-transitory computer-readable storage medium of claim 12, wherein the display device periodically presents the first and second monitoring views.

15. The non-transitory computer-readable storage medium of claim 12, wherein the display device of a security analyst comprises a television (TV) and wherein the management service comprises an application running on a TV operating system of the digital media streaming player device.

16. The non-transitory computer-readable storage medium of claim 12, wherein the first device comprises a network security device, which detects an anomaly in behavior of any of the plurality of devices.

17. The non-transitory computer-readable storage medium of claim 16, wherein the network security device reports the detected anomaly to a management service associated with the display device or the digital media streaming player device responsive to receipt of a request from the management service.

18. The non-transitory computer-readable storage medium of claim 17, wherein in response to receiving an indication of the detected anomaly, the management service flags the device associated with the anomaly and presents the device as a flagged device in a monitoring view of the plurality of monitoring views.

19. The non-transitory computer-readable storage medium of claim 12, wherein the information regarding the plurality of devices is retrieved by querying a network security device through one or more application programming interface (API) calls.

20. A system for remote monitoring of a Security Operations Center (SOC), the system comprising:

a display device;

a non-transitory computer-readable storage medium embodying a set of instructions, which when executed by one or more processors of the display device, causes the one or more processors to perform a method for remote Security Operations Center (SOC) monitoring, said method comprising:

retrieving, by a management service executing on a processing resource, information regarding a plurality of devices included within a network that are being monitored by the SOC;

generating, by the management service executing on the processing resource, a first monitoring view to display first categories of potential network security-related issues detected by the SOC in real-time and a second monitoring view to display second categories of potential network security-related issues detected by the SOC in real-time;

associating a first plurality of monitored devices with the first monitoring view based on the first category of parameters shared by the first plurality of monitored devices and a second plurality of monitored devices with the second monitoring view based on the second category of parameters shared by the second plurality of monitored devices, wherein the first category of parameters comprises a first network security related issue associated with the first plurality of monitored devices and the second category of parameters comprises a second network security related issue associated with the second plurality of monitored devices that is different than the first network security related issue;

assigning, by the management service executing on the processing resource, a first priority to the first monitoring view based on a first severity level corresponding to each of the first plurality of monitored devices and a second priority to the second monitoring view based on a second severity level corresponding to each of the second plurality of monitored devices; and facilitating monitoring of the SOC, by the management service executing on the processing resource, causing a video to be presented on a display device that cycles through the first and second monitoring views in accordance with the first and second assigned priorities and under control of a real-time user input provided via a graphical user interface.

* * * * *